(No Model.)
W. STANLEY, Jr.
ELECTRICAL CONVERTER.
No. 428,574. Patented May 20, 1890.
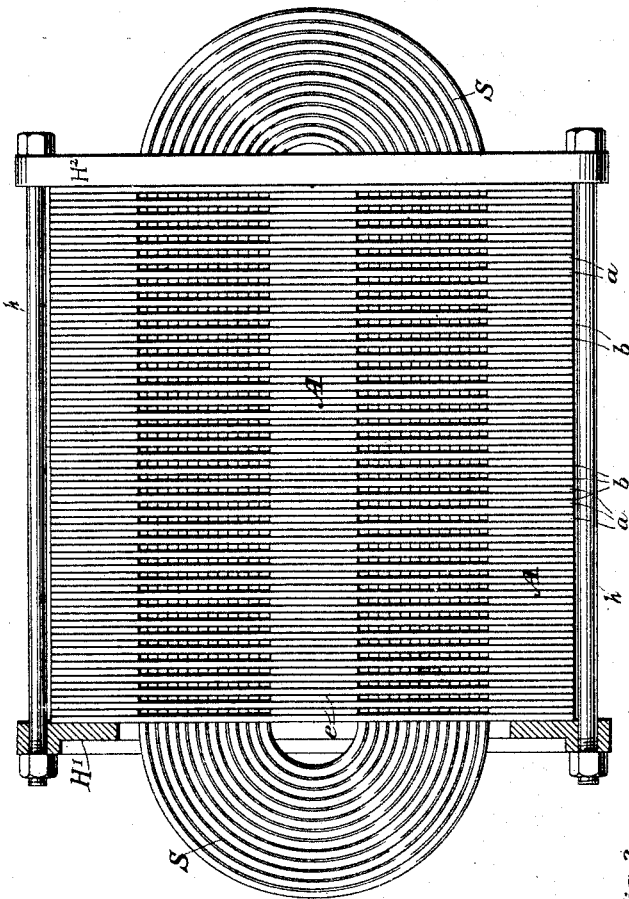
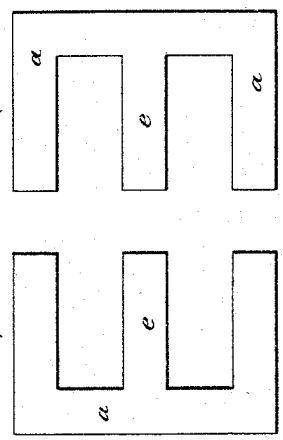
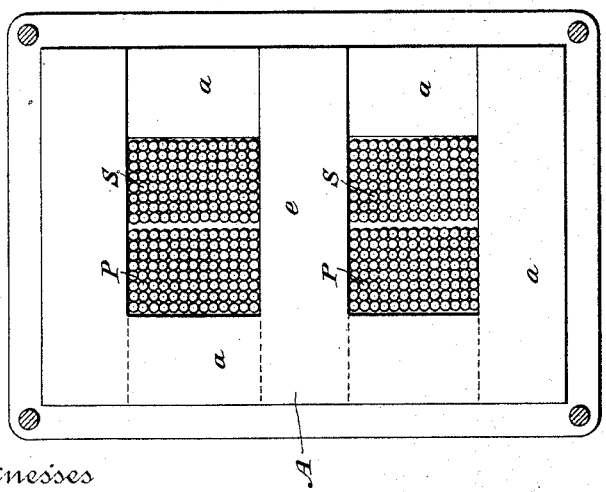
Witnesses
Geo. W. Breck.
Carrie E. Ashley
Inventor
Wm. Stanley Jr.
By his Attorneys
Pope & Edgecomb

UNITED STATES PATENT OFFICE.

WILLIAM STANLEY, JR., OF GREAT BARRINGTON, MASSACHUSETTS, ASSIGNOR TO GEORGE WESTINGHOUSE, JR., OF PITTSBURG, PENNSYLVANIA.

ELECTRICAL CONVERTER.

SPECIFICATION forming part of Letters Patent No. 428,574, dated May 20, 1890.

Application filed November 23, 1886. Serial No. 219,552. (No model.) Patented in England July 12, 1887, No. 9,726; in France July 12, 1887, No. 184,768; in Belgium July 12, 1887, No. 78,165; in Germany July 12, 1887, No. 43,684; in Italy July 12, 1887, XLIII, 356, and in Canada November 10, 1887, No. 27,964.

*To all whom it may concern:*

Be it known that I, WILLIAM STANLEY, Jr., a citizen of the United States, residing in Great Barrington, county of Berkshire, and State of Massachusetts, have invented certain new and useful Improvements in Electric Converters, (for which I have obtained Letters Patent in England July 12, 1887, No. 9,726; in France July 12, 1887, No. 184,768; in Belgium July 12, 1887, No. 78,165; in Germany July 12, 1887, No. 43,684; in Italy July 12, 1887, XLIII, 356, and in Canada November 10, 1887, No. 27,964,) of which the following is a specification.

The invention relates to apparatus employed for transforming alternating, pulsatory, or intermittent primary electric currents into alternating, secondary, or induced currents. Devices for this purpose are technically termed "inductoriums," "transformers," or "converters." When an alternating, intermittent, or pulsatory current is made to traverse an electric conductor, a magnetic field is produced in its vicinity the intensity and polarity of which depend upon the character of the originating current, and any mass of magnetizable material—for instance, iron—situated within this field becomes magnetic. The alternating magnetization and demagnetization of such a mass of iron or the reversal of its magnetic polarity in its turn tends to produce corresponding electro-motive forces in neighboring conductors. Such electro-motive forces give rise to electric currents when these conductors form a closed circuit; hence the mass of iron reacts inductively both on the conductor traversed by the originating or primary current as well as upon any other conductor within its influence. An independent conductor thus placed within the inductive field is called a "secondary conductor."

It is well known that in an apparatus of this kind the net efficiency of electric conversion from a primary to a secondary current with a given weight of metal is largely increased by forming the magnetizable mass or "core," as it is technically termed, into a closed magnetic circuit or ring. It is also known that the efficiency of the apparatus is greater if the mass of iron forming the core be laminated in a direction approximately parallel to the lines of magnetic force within the field to prevent the production of Foucault currents. Higher efficiency, other things being equal, is also assured if the mass of magnetizable material be symmetrically disposed about the mean axis of the transverse section of the coils formed by the primary and secondary conductors.

The object in the present invention is to provide a converter in which all the advantages above enumerated shall be combined as far as practicable.

In the accompanying drawings, Figure 1 is an end view (the coil being in section) of a converter embodying the invention, and Fig. 2 is a side view of the same. Fig. 3 is a detached view (drawn to a reduced scale) showing two of the plates of which the core is composed.

Referring to the figures, P S respectively represent the primary and secondary conducting-wires, which constitute the coils of the converter. In Fig. 2 these coils are shown as separated from each other by an intervening insulating-space. These coils serve, respectively, for conducting the inducing and the induced currents.

The core A is composed of a number of plates $a\ a$ of soft iron, which may with advantage be made very thin. These plates may be separated from each other by intervening layers $b\ b$ of non-conducting material. Each individual plate is formed with three lateral tongues projecting in the same direction, as shown in Figs. 1 and 3, so that the configuration of the finished plate resembles that of the letter E.

In building the converter the electric conductors are first wound into oval or flattened coils, which may with advantage be of rectangular cross-section. The plates $a\ a$ are then applied, the middle tongue $e$ being inserted in the space within the coils, while the exterior tongues and the bodies of the plates surround the exterior of the coils on three sides.

In assembling the plates to form the core each alternate plate is inserted from the opposite side, and in this way the aggregate mass of iron necessarily becomes symmetrically distributed on every side of the mean axis of the transverse section of the coiled conductors.

The plates are securely bound together by means of the end frames or heads H′ H², connected by longitudinal bolts $h\ h$.

In another application, filed on the 6th day of March, 1889, No. 302,141, the method of building or constructing converters herein set forth is claimed.

I claim as my invention—

1. A core for electric converters, composed of separate E-shaped plates symmetrically disposed about the coiled conductors, as set forth.

2. In an electrical converter, the combination, with the coiled conductors, of a core composed of a number of plates separated from each other and alternately arranged about the coiled conductors in the manner described, so that the mass of the core is symmetrically disposed about the mean axis of the coils.

3. The combination, with a coiled primary conductor, of a core consisting of a number of plates, each of which plates is provided with three projecting tongues, one situated within and the other two without the coil, as set forth.

4. A core for electrical converters, consisting of superposed E-shaped plates of soft iron, a portion of the said plates having their tongues projecting in one direction and the remainder having their tongues projecting in the opposite direction, leaving two openings for the conductors, substantially as described.

5. In an induction-coil, a core of soft iron, composed of insulated E-shaped plates, each inclosing a coiled conductor on three sides, said plates being alternately inserted from opposite sides of said coiled conductor, as set forth.

6. A core-plate for electric converters, consisting of a main body, and three arms or tongues projecting therefrom in the same general direction.

7. A core for electric apparatus, composed of thin plates of soft iron and sheets of insulating material pasted or otherwise fastened to one surface thereof.

In testimony whereof I have hereunto subscribed my name this 19th day of November, A. D. 1886.

WILLIAM STANLEY, Jr.

Witnesses:
　DANL. W. EDGECOMB,
　CHARLES A. TERRY.